United States Patent

Hutchins, IV

[11] 3,905,005
[45] Sept. 9, 1975

[54] DEFLECTION-SENSITIVE ELECTRICAL TRANSDUCER WITH DEFLECTION FOCUSING

[76] Inventor: Thomas B. Hutchins, IV, 310 N.W. Brynwood Ln., Portland, Oreg. 97229

[22] Filed: Apr. 29, 1974

[21] Appl. No.: 465,236

Related U.S. Application Data

[63] Continuation of Ser. No. 364,081, May 25, 1973, abandoned.

[52] U.S. Cl. .................................................. 338/2
[51] Int. Cl.² ........................................ G01L 1/22
[58] Field of Search ............................ 338/2–6; 73/88.5 SD, 998 AR; 128/2.05 D

[56] References Cited
UNITED STATES PATENTS
2,621,276   12/1952   Howland ................................ 338/2
3,724,274   4/1973   Millar .................................. 338/4 X Primary Examiner—C. L. Albritton
Attorney, Agent, or Firm—Kolisch, Hartwell, Dickinson & Stuart

[57] ABSTRACT

A deflection-sensitive, electrical-signal-producing transducer including a piezoresistive element anchored to one side of a flat ceramic carrier through a pair of thin metallic seats formed on the carrier, and a pair of spaced conductive solder blankets which join the opposite ends of the element to the seats. Such blankets serve both as a conductive medium for making electrical connections with the element, and, along with the seats, as rigidifiers for the carrier's and element's ends. Rigidification thus achieved, plus separation by the seats of the element and carrier, focuses any deflection experienced by the transducer into the midregions of the carrier and element, which action maximizes sensitivity.

4 Claims, 3 Drawing Figures

DEFLECTION-SENSITIVE ELECTRICAL TRANSDUCER WITH DEFLECTION FOCUSING

CROSS-REFERENCE TO OTHER APPLICATION

This application is a continuation of my copending U.S. application Ser. No. 364,081, filed May 25, 1973, and now abandoned, for "Deflection-Sensitive Electrical Transducer With Deflection Focusing."

BACKGROUND AND SUMMARY OF THE INVENTION

This invention pertains to a deflection-sensitive transducer, and especially to such a device which produces an electrical signal accurately interpretable as an indication of the amount of outside-influenced deflection experienced by the transducer. For illustration purposes, a preferred embodiment of the invention is disclosed in a form usable in a bloodpressure-monitoring catheter.

There are many cases where it is desirable to obtain information about the performance of something through monitoring vibrations, deflections, pressure changes, etc. associated with the particular thing. For example, during various surgical procedures, it is desirable to monitor the instantaneous changes in arterial blood pressure, thus to have certain current information about heart functioning. In a large number of such applications --blood-pressure-monitoring included-- satisfactory monitoring requires a sturdy, yet extremely sensitive transducer for accuately following subtle changes in vibration, deflection, pressure, etc., which are of interest.

A general object of the present invention is to provide a novel transducer having these desirable characteristics.

More particularly, an object of the invention is to provide a deflection-sensitive, electrical-signal-producing transducer which features a special construction that offers both good durability, and high sensitivity.

According to the invention, the transducer includes an elongated electrically insulative carrier on which is mounted, in spaced-apart relation, an axially paralleling, elongated piezoresistive element. Contacting the ends of the carrier and element, and spacing these two components, are a pair of spacedapart metallic seats. Deposits of a gold-tin alloy bond the ends of the element onto the seats. These seats and deposits, in addition, accommodate electrical connections with the ends of the piezoresistive element, and also serve to rigidify the ends both of the element and of the carrier. The significance of such rigidification, and of separation between the element and carrier, is that they cooperate to focus any deflection experienced by the transducer into the midregions of the carrier and element, thus enhancing sensitivity.

Electrical connections between the opposite ends of the piezoresistive element and equipment outside the transducer are made through conductive wires which have end portions that extend into the alloy deposits mentioned. These wires end portions cooperate with the deposits and seats in providing rigidification.

Description of the Drawings

These and other objects and advantages attained by the invention will become more fully apparent as the description which follows is read in conjunction with the accompanying drawings, wherein.

DETAILED DESCRIPTION OF THE INVENTION

Figure 1:
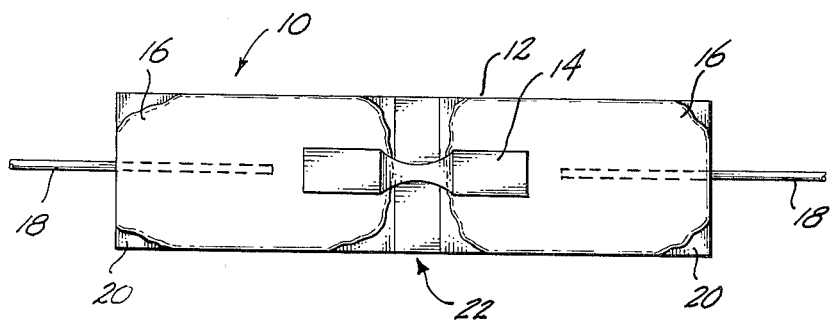
FIG. 1 is a plan view illustrating a transducer constructed in accordance with the invention.
Figure 2:
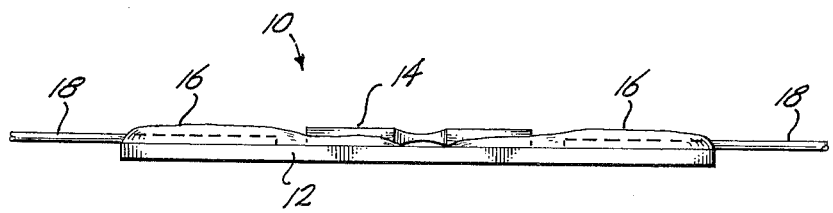
FIG. 2 is a side elevation taken from the bottom side of FIG. 1.

Turning now to the drawings, and referring first to FIGS. 1 and 2, indicated generally at 10 is a transducer constructed in accordance with the present invention. Transducer 10 is especially adapted for use in the tip of a blood-pressure-monitoring catheter, such as that disclosed in U.S. Pat. No. 3,710,781. To this end, transducer 10 is, of course, sized appropriately to fit within the relatively small dimension of such a tip. It should be understood, however, that transducer 10, configured as illustrated, and sized as will be explained shortly, is readily usable in a large number of other applications.

Included in transducer 10 are a carrier plate, or carrier, 12, a piezoresistive element 14, a pair of spaced-apart metallic seats 20, two electrically conductive spaced-apart solder deposits 16, and two wire conductors 18. These elements perform as a device for responding to external forces which deflect carrier 12, and for producing from such a deflection a proportional electrical signal which is transmittable over conductors 18 to outside apparatus for monitoring purposes. Proportions in these parts have been exaggerated in some cases to clarify the drawings. Seats 20 appear only in the plan views of FIGS. 1 and 3.

To obtain the most satisfactory performance, it is desirable that carrier 12 be formed of a material which is relatively hard, yet elastically deformable, and at the same time, characterized by good dimensional stability in the presence of ambient temperature changes. These characteristics promote accuracy and reliability in the transducer. For example, and having in mind that carrier 12 functions primarily to transmit the effects of externally applied forces into element 14, hardness is a feature which ensures good telegraphing of such effects. Elastic flexibility enhances sensitivity, in that it enables an accurate deflecting response to an external force. Dimensional stability in the presence of ambient temperature changes is important, of course, in preventing the transducer from generating a signal solely based on an ambient temperature change. A further requirement is that the carrier must be electrically insulative.

Ceramic materials in general meet these qualifications, and aluminum oxide in particular has been found to be very useful for the intended purpose. Thus, carrier 12 is formed from an elongated, thin, rectangular strip of aluminum oxide. Its length herein is about 0.2-inches, its width about 0.05-inches, and its thickness about 0.006-inches.

Formed on the end face portions of carrier 12 which confront the viewer in FIG. 1 are previously mentioned metal seats, or coatings, 20. The primary functions of these coatings are to provide good anchoring pads for anchoring ends of element 14 and wires 18 (via deposits 16) to the carrier, and to hold carrier 12 and element 14 apart from one another along the length of the element. The coatings also contribute to the above-mentioned rigidification. Each of these coatings extends over the full width of the carrier, and has a thickness of about 0.001-inches, and a length of about 0.09-inches. The two coatings, thus, are spaced apart longitudinally axially on the carrier by about 0.02-inches.

While in the final transducer it is necessary to end up with two such spaced coatings, it is simplest to prepare them first as a single coating whose central portion is later removed, as by etching or grinding, to end up with the two final coatings.

The preparation of such a metal coating is entirely conventional. Three layers of three different metals are involved. First to be applied to the carrier is a metal mixture containing molybdenum and manganese, such being applied by a conventional moly-manganese metalization process. Such a material is first used, since it bonds extremely well to ceramic materials, and provides a good footing for the second metal layer. Next to be applied, also in any suitable manner, is nickel. Nickel joins well to the moly-manganese layer, and affords a good bonding structure for solder deposits 16 (which will be described more fully later). Finally, the nickel layer is gold-plated, to minimize oxidation, and also to provide a surface to which the solder deposits can easily wet when they are applied. These three metal layers result in the total coating thickness mentioned above of about 0.001-inches. After such preparation of the coating, the central region thereof is suitably removed to provide gap 22 which exposes the longitudinally axially central region of carrier 12.

Piezoresistive element 14 herein is formed from an elongated slender dimensionally stable rod of silicon. The element has a length herein of about 0.075-inches, with a generally rectangular cross section. In the end portions of the element, the cross-sectional dimensions are about 0.025-inches by about 0.005-inches—the larger of these dimensions facing the viewer in FIG. 1. In the central portion of element 14, the cross-sectional dimensions are about 0.01-inches by about 0.003-inches. Reduction may be achieved in any suitable manner, as by etching.

Joining the opposite ends of element 14 through coatings 20 to the opposite ends of carrier 12 are the two solder deposits 16. These solder deposits bond the confronting faces of the end of the piezoresistive element and of metal coatings 20. According to an important feature of the invention, element 14 is disposed with its longitudinal midregion, i.e., the reduced cross section portion, essentially centered over and spanning gap 22. Further, the piezoresistive element is disposed with its longitudinal axis substantially paralleling the longitudinal axis of carrier 12. The importance of this arrangement will be explained shortly.

Solder deposits 16, in addition to performing a joining and an electrical conduction function, play, along with coatings 20, an extremely important role in promoting both good accuracy and good sensitivity in transducer 10. It is important that these deposits, or blankets as they are also referred to, have certain structural characteristics. Namely, they should comprise a meterial which has a relatively low melting point, yet which when cooled and solidified, exhibits relatively high hardness, as well as good elasticity. The lower the melting point of this material, the better, since such enables relatively low-temperature bonding of element 14 in place, which procedure greatly minimizes the chance that undesirable strains will be placed in the element or the carrier during the assembly process. High hardness and good elasticity prevent the solder deposits from exerting any undesirable independent influence on the piezoresistive element which could lead to serious inaccuracies in the performance of the transducer.

For example, if the solder material in its final form were too soft, over time there could be considerable relative movement, or creep, between element 14 and carrier 12. This, of course, is to be avoided. Elasticity is important in enabling the deposits properly to flex with carrier 12 without experiencing nonelastic dimensional changes.

A material which has been found to offer all of these characteristics, and to be especially well suited to the purpose described, is a gold-tin alloy containing, by weight, about 20% tin and 80% gold. This material melts at about 280°C which is a suitably low temperature.

Soldering of element 14 into place with deposits 16 may be done in any suitable fashion. It is desirable, however, that the solder deposits in their final form as nearly as possible completely cover metal coatings 20, and have a thickness in most areas of about 0.0013-inches.

These hard deposits, in addition to anchoring element 14 in place, serve the further extremely important purpose, along with the coatings, of rigidifying the contacted end portions of both carrier 12 and element 14. Significantly, rigidification does not take place in the midregions of the carrier and element—i.e., in gap 22 and in the reduced cross section portion of element 14.

This rigidification has the effect of focusing bending or deflections or other deformations of the carrier and piezoresistive element into the midregions thereof. And, such a construction has been found to yield a transducer with extremely good sensitivity. Especially important in the construction is that the solder deposits extend as single continuous blankets over essentially the entire end portions (i.e., the metal coated portions) of carrier 12. In fact, and as can be seen, the solder deposits also serve to anchor in place end portions of conductors 18. Were separate solder deposits used for each end of element 14 as well as for each end portion of conductors 18, there would result a plurality, namely four, rigidified regions along carrier 12, with the result that deflection focusing to the midregions would not occur, or at least would be greatly minimized. Such a construction would not offer the sensitivity achieved by transducer 10.

Deposits 16, being good electrical conductors, serve the further purpose of making electrical connections between the ends of element 14 and conductors 18.

Completing a description of transducer 10, it will be noted that the embedded end portions of conductors 18 extend a considerable distance into deposits 16. Further, it will be observed that these end portions are straight, and are essentially aligned with the longitudinal axes of carrier 12 and element 14. Finally, it will be noted that wires 18 extend longitudinally away from the ends of the carrier. Such a construction is desirable for several reasons. First, such embedding and placement of the wires results in their embedded end portions further tending to rigidify carrier 12. Thus, their presence tends to promote the desirable deflection focusing performance. Secondly, with the wires extending longitudinally away from the opposite ends of the carrier, stains placed in these wires have a negligible effect on the response of element 14. This is to be distinguished from a construction where the wires extend away from a side of the carrier. The wires used herein comprise vinyl-insulated copper wire having a diameter of about .004-inches.

Transducer 10, constructed as just described, performs as a highly accurate and extremely sensitive deflection-sensing device. The types of materials selected for its parts, as discussed above, promote extremely good accuracy. The special arrangement and disposition of the solder deposits and coatings, and the placement of the ends of the conductors, promote the important rigidifying and deflection focusing features of the transducer--i.e., the features which yield good sensitivity. With coatings 20 completely separating or spacing the element and carrier, a given amount of bending in the carrier is magnified in its transmission into the element. This, of course, further contributes to sensitivity. During operation, the signals which are produced by transducer 10 are in the form of changes in the resistance of element 14.

Figure 3:
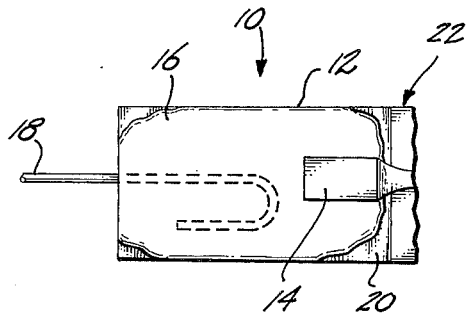
FIG. 3 is a fragmentary plan view illustrating a modified form of the transducer.

FIG. 3 illustrates a modification of the transducer wherein even greater rigidification is achieved by forming a reverse bend as shown in the embedded ends of conductors 18. Here, an embedded end includes a pair of straight stretches substantially paralleling the longitudinal axis of the carrier. Other wire end arrangements may, of course, be used.

While a preferred embodiment and a modification of the invention have been described herein, it is appreciated that other variations and modifications may be made without departing from its spirit.

It is claimed and desired to secure by Letters Patent:
1. A deflection-sensitive electrical-signal-producing transducer comprising
   an elongated electrically insulative carrier having along its length a uniform transverse cross-sectional configuration,
   a pair of spaced-apart metallic seats joined to a side of said carrier and disposed towards the opposite ends thereof,
   an elongated piezoresistive element mounted on said seats and separated thereby along its length from said carrier, said element being positioned with its longitudinal axis substantially paralleling that of said carrier, and with its longitudinal midregion located adjacent that of the carrier, and
   means accommodating electrical connections with opposite ends of said element, said means comprising a pair of spacedapart electrically conductive metallic blankets extending over said seats, and joined both to said seats and to said ends of said element,
   said seats and blankets cooperating with one another to rigidify the ends of said carrier and said element, thereby to focus into said midregions any deflections experienced by the transducer.

2. The transducer of claim 1, wherein said carrier is formed of a ceramic material 3. The transducer of claim 1, wherein the means accommodating said electrical connections comprises a pair of elongated conductive wires each having an end portion embedded in a different one of said blankets, each such end portion including a generally straight reach substantially paralleling said axes.

4. The transducer of claim 3, wherein each end portion of a wire includes at least one more generally straight reach also embedded in a blanket and also substantially paralleling said axes.

* * * * *